(12) United States Patent
Reinhard et al.

(10) Patent No.: US 6,536,708 B1
(45) Date of Patent: Mar. 25, 2003

(54) TAKE-OFF DEVICE FOR AIRPLANES

(75) Inventors: Andreas Reinhard, Zürich (CH); Sepp Steffen, Altbüron (CH); Hans-Ulrich Ammann, Langenthal (CH)

(73) Assignee: Prospective Concepts AG, Zollikon (CH)

( * ) Notice: Subject to any disclaimer, the term of this patent is extended or adjusted under 35 U.S.C. 154(b) by 0 days.

(21) Appl. No.: 09/463,628

(22) PCT Filed: May 6, 1999

(86) PCT No.: PCT/CH99/00189

§ 371 (c)(1),
(2), (4) Date: May 1, 2000

(87) PCT Pub. No.: WO99/61318

PCT Pub. Date: Dec. 2, 1999

(30) Foreign Application Priority Data

May 26, 1998 (CH) .............................. 1149/98

(51) Int. Cl.⁷ .............................................. B64F 1/04
(52) U.S. Cl. .......................................... 244/63; 244/62
(58) Field of Search ..................... 244/62, 63; 89/1.34, 89/1.816

(56) References Cited

U.S. PATENT DOCUMENTS

| | | | |
|---|---|---|---|
| 1,802,649 A | * 4/1931 | Heinkel | 244/63 |
| 2,843,342 A | * 7/1958 | Ward | 244/63 |
| 3,968,947 A | 7/1976 | Schlegel et al. | 244/63 |
| 4,238,093 A | * 12/1980 | Siegel et al. | 244/63 |
| 4,279,195 A | * 7/1981 | Miller | 244/63 |
| 4,333,382 A | 6/1982 | Holt et al. | 89/1.806 |
| 4,524,929 A | 6/1985 | Gebhard | 244/63 |

FOREIGN PATENT DOCUMENTS

| | | | | |
|---|---|---|---|---|
| DE | 485628 C | | 7/1931 | |
| GB | 2173745 A | * | 10/1986 | B64F/01/06 |

OTHER PUBLICATIONS

European Patent Office, *International Search Report*, completed Jul. 7, 1999, 3 pgs.

* cited by examiner

*Primary Examiner*—Charles T. Jordan
*Assistant Examiner*—Gabriel S Sukman
(74) *Attorney, Agent, or Firm*—Jenkens & Gilchrist, P.C.

(57) ABSTRACT

A take-off device includes a telescopic arrangement of three pipes arranged in a frame. The telescopic arrangement can pivot to a limited extent. The frame is mounted on a horizontal axis running through a center of gravity of the device and a centroidal axis of a lift of an airplane wing, whereby the frame can pivot around the axis. Forces exerted between the telescopic arrangement and the frame are transmitted via a bushing wedged on an outer pipe of the three pipes. A compressed gas accumulator can be opened by means of an actuating pressure signal, whereupon the telescopic arrangement extends outward. A bottom portion of an innermost tube knocks against a fixed point on the ground, which allows the airplane to accelerate to a lift-off speed. After the telescopic arrangement has extended outward, the telescopic arrangement retracts inward using a compressed gas stored in a pressure chamber.

25 Claims, 3 Drawing Sheets

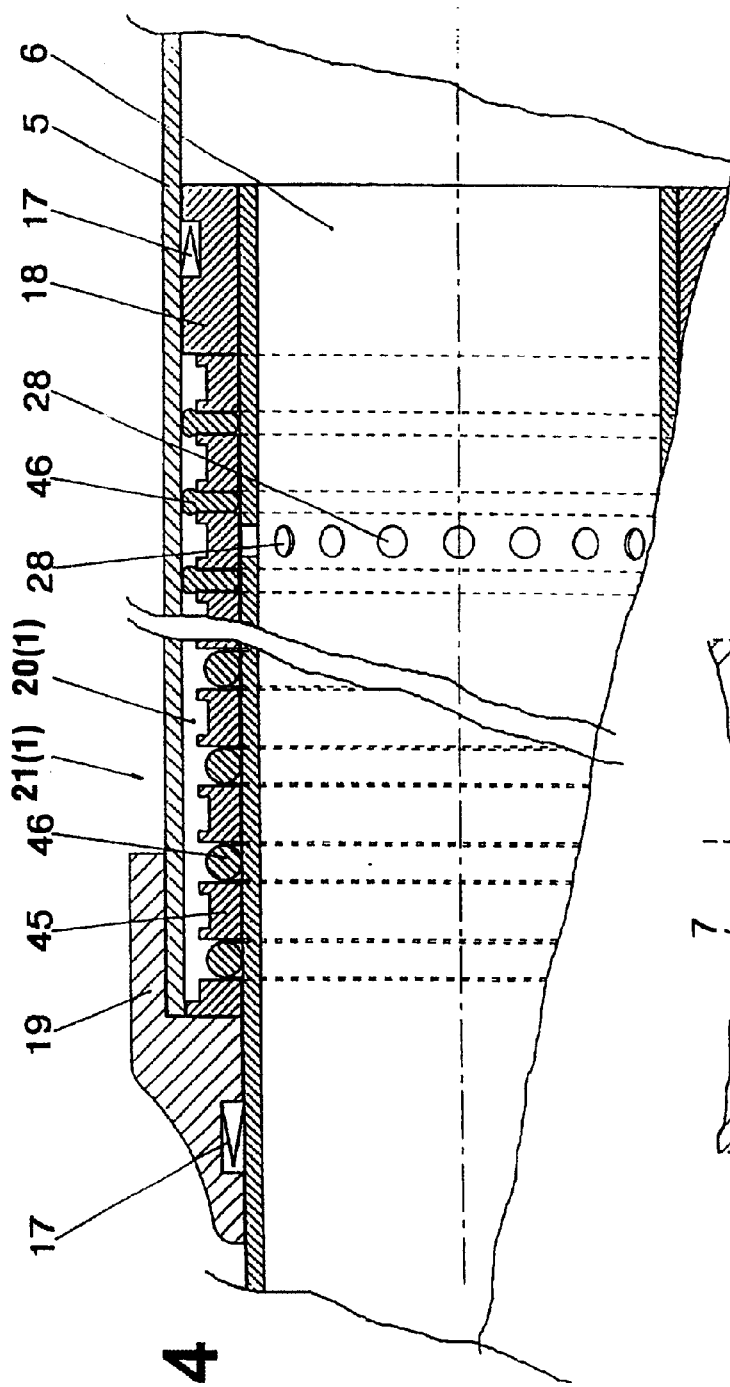
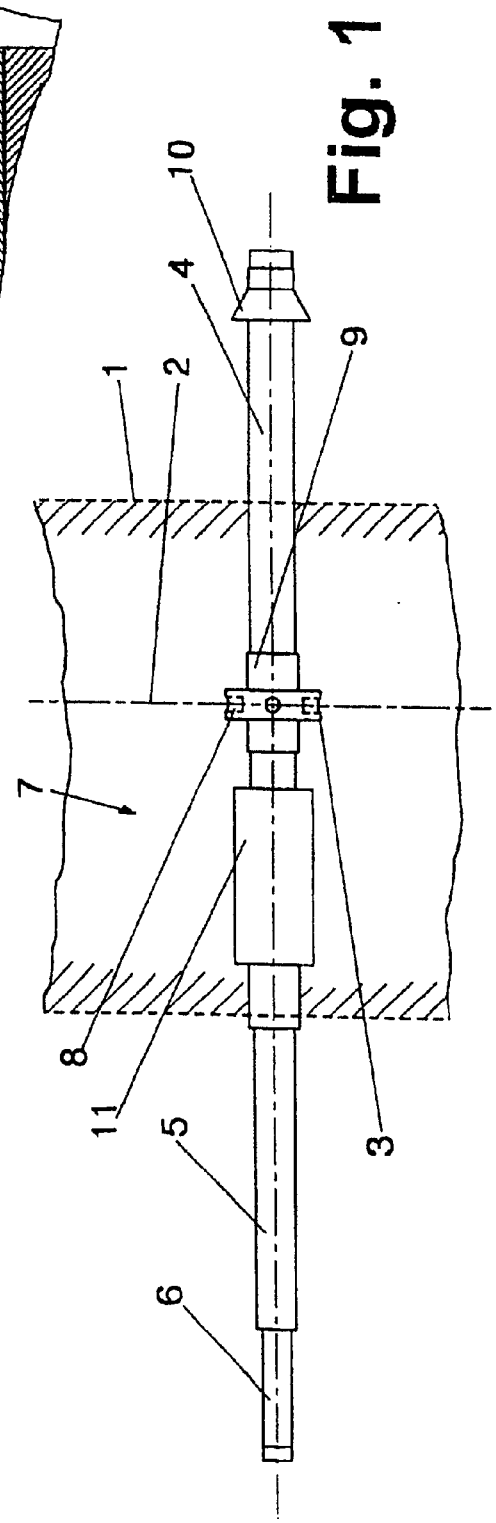

TAKE-OFF DEVICE FOR AIRPLANES

BACKGROUND

1. Technical Field

The present invention generally relates to a take-off device for aircraft and vehicles, and more particularly to a take-off device for airplanes that permits an airplane to accelerate to a lift-off speed.

2. History of Related Art

Take-off devices for aircraft are generally known, be they catapults for military aircraft on aircraft carriers, or be they take-off devices for gliders in the form of motor-driven winch arrangements for a take-off rope or rubber ropes.

All these known devices have in common that they have fixed site installations, which most typically encompass the whole device and also include only an accepting hook for the take-off device on the aircraft side; thus, the device can be applied only to the fixed site. In addition, all these devices are heavy and, in the case of those on aircraft carriers, are not transportable.

A take-off device that can be joined to the aircraft or vehicle and thus has practically no fixed site components would be desirable. The desirable take-off device would also be capable of being applied in light aircraft without any large modifications for fixed sites, such that the device could also be applied outside the aircraft or vehicle.

SUMMARY OF THE INVENTION

A take-off and accelerating device includes a telescopic arrangement, at least one pressure accumulator, means for retracting an inner tube and at least one middle tube, and means for blowing off pressurised gas. The telescopic arrangement has an outer tube, the inner tube, and the at least one middle tube. The inner tube, the outer tube, and the at least one middle tube are adapted to slide against each other and are airtight. The at least one pressure accumulator has a valve for release of an outflow of compressed gas out of the at least one pressure accumulator into the telescopic arrangement. The at least one pressure accumulator includes means to open the valve and means to damp the outer tube, the inner tube, and the at least one middle tube against each other at ends of their respective sliding motions. The outermost tube is mounted in a frame. The device is adapted to be installed on-board a vehicle. The means for retracting is adapted to retract the inner tube and the at least one middle tube from a telescopically extended condition into a retracted condition. The means for blowing off pressurised gas is adapted to blow off pressurized gas after extension of the telescopic arrangement.

BRIEF DESCRIPTION OF THE DRAWINGS

The disclosed invention will be described with reference to the accompanying drawings, which show important sample embodiments of the invention, wherein:

FIG. 1 is a schematic representation of a basic construction of a take-off device according to principles of the invention;

FIG. 4 is a view of an embodiment of a damping device 21(1) according to principles of the present invention.

DETAILED DESCRIPTION OF EXEMPLARY EMBODIMENTS OF THE INVENTION

Figure 3:
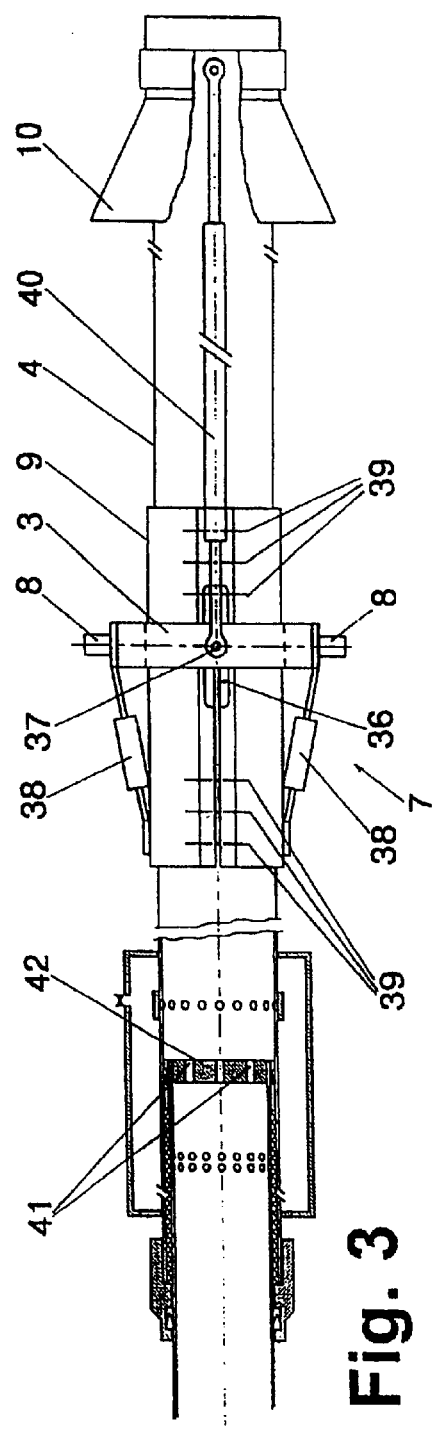
FIG. 3 is a detailed view of the cardan mounting and its interaction with other parts of the device according to principles of the invention.

FIG. 1 shows in schematic representation a basic construction of a take-off device according to principles of the invention. A wing of an aircraft is referenced 1, a centre line of lift of the wing 1 being referenced 2. Essentially in a section from a longitudinal axis of the aircraft and a centre line of lift 2, a frame 3 of a cardan mounting is arranged such that the frame 3 can pivot about a horizontal axis 8.

Through and guided by the frame 3 runs an outermost tube 4 of a telescopic arrangement 7, the telescopic arrangement 7 including the outermost tube 4, a middle tube 5, and an inner tube 6. The frame 3 of the cardan mounting engages with a vertical axle 37 on a sleeve 9. The sleeve 9 surrounds the outermost tube 4.

In a retracted condition of the telescopic arrangement 7, a centre of gravity of the telescopic arrangement 7 is essentially in the centre of the frame 3, so that no turning moments have to be considered. The take-off device is driven from the retracted condition with compressed gas. A rear end of the inner tube 6 presses against a push-off point present on the ground. The telescopic arrangement 7 expands to about three times a length of the telescopic arrangement 7 when in the retracted condition and provides the aircraft with a necessary take-off speed. When the telescopic arrangement 7 has completely extended, the telescopic arrangement 7 is drawn in by compressed gas in a similar fashion to the manner in which the telescopic arrangement 7 expands. Compressed gas present in the telescopic arrangement 7 that is no longer required after push off is discharged through a main release valve and guided rearward by a funnel 10. On the outermost tube 4, there is a pressure chamber 11 which, following expulsion of gas from the middle tube 5 and the inner tube 6, is filled with compressed gas, which compressed gas is then used to retract the tubes again. After the end of the take-off procedure, the take-off device is fixed in the aircraft in a turning moment-free position.

Figure 2:
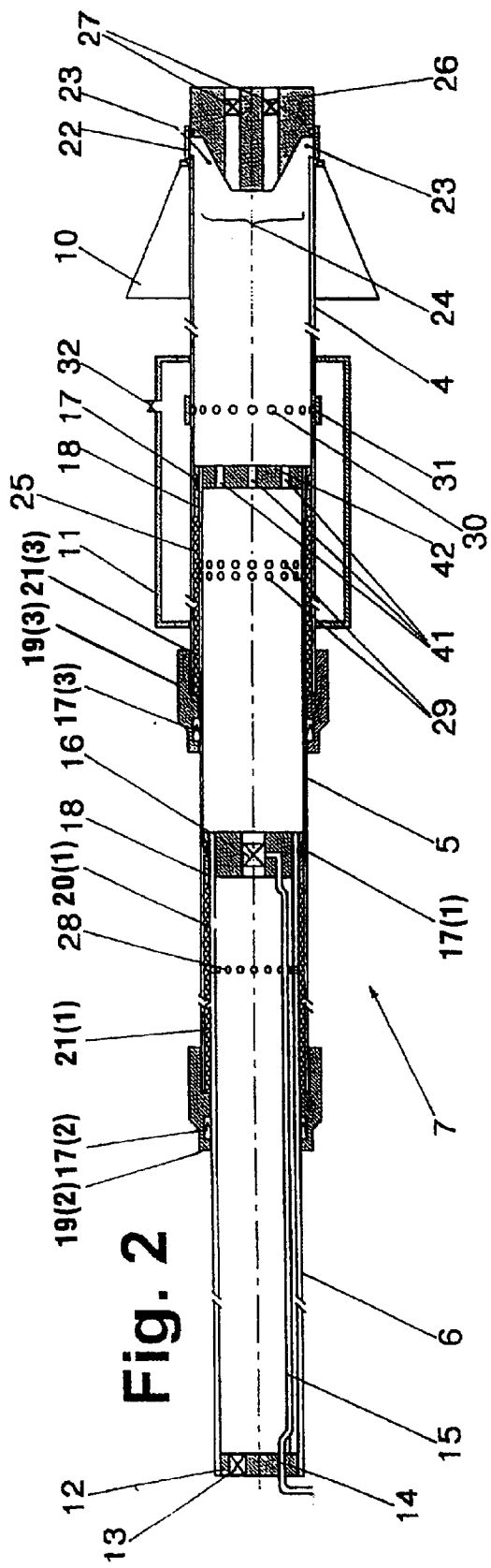
FIG. 2 is a longitudinal section view of an embodiment of the present invention.

In the following Figures the construction and method of working of the telescopic arrangement are described in more detail. FIG. 2 shows a longitudinal section of an embodiment of the present invention. The frame 3 with the sleeve 9 and other details yet to be shown are omitted and the telescopic arrangement 7 is shown in the fully-extended position.

The inner tube 6 has a base 12 at a rear end of the inner tube 6. The base 12 contains a filling valve 13 and a lead-through 14 for a control gas pipe 15. The control gas pipe 15 passes through the inner tube 6 along a length of the inner tube 6 and opens into a valve 16 at a front end of the inner tube 6. The inner tube 6 is designed as a pressure accumulator for the working compressed gas. With the valve 16 closed, the inner tube 6 is filled to a required working pressure from an external high-pressure source, such as a pressure bottle or a compressor, via the filling valve 13.

At a forward end of the inner tube 6, the inner tube 6 is surrounded by an inner guide ring 18. The inner tube 6 is provided with a seal 17(1). The seal 17(1) is fastened to the inner tube 6 via a screw thread. At a rear end of the middle tube 5 is an outer guide ring 19(2). The outer guide ring 19(2) similarly has a seal 17(2). The seal 17(2) of the outer guide ring 19(2) is fastened in a similar manner to the seal 17(1) of the inner guide ring 18. Between the middle tube 5 and the inner tube 6 is a cylindrical clearance 20(1). The cylindrical clearance 20(1) is sealed by the guide rings 18 and 19(2) with the seals 17(1) and 17(2). In a rear part of the cylindrical clearance 20(1) there is a damping device 21(1), shown here in summary as a spring and considered further in FIG. 4.

Between the outermost tube 4 and the middle tube 5, the mutual seal is approached in the same way as between the inner tube 6 and the middle tube 5, so that an inner guide ring 18 and an outer guide ring 19(3) with seals 17(3) are present, whereby a cylindrical clearance 25 arises, in which, similarly, a damping device 21(3) is arranged. At the forward end of the outermost tube 4 sits the funnel 10. The funnel 10 can be slid lengthwise and seals, with a ring 22, radially opening holes 23 of a main release valve 24. The funnel 10 is worked into the head piece 26 of the outermost tube 4. Two relief valves 27 are shown.

Towards a forward end of the middle tube 5, for instance about ⅕ of the length of the middle tube 5, which is controlled by the length of the damping device 21(3), the middle tube 5 has a row of holes 28. The holes 28, when the telescopic arrangement 7 is in the extended position, come to lie in the region of the damping device 21(3) and serve to ventilate the cylindrical clearance 20(1) during extension and—as described in more detail later—to retract the telescopic arrangement 7 back again.

The outermost tube 4 carries, at a similar position to the middle tube 5, a double row of holes 29 and, at some distance from the holes 29 (e.g., at about ½₀ of the tube length) a further row of holes 30. The holes 30 are configured as non-return valves and are, for instance, covered by an elastomer band 31. The holes 29 and 30 open into the pressure chamber 11. The pressure chamber 11 is equipped with a bleed valve 32.

FIG. 3 shows in detail the cardan mounting and interaction of the cardan mounting with other parts of the device according to principles of the invention. While the left hand side of FIG. 3 shows part of what is shown in FIG. 2, the right hand side of FIG. 3 is a plan view of central-to-forward part of the outermost tube 4. The frame 3 of the cardan mounting of the telescopic arrangement 7 can pivot about the horizontal axle 8. The horizontal axle 8 is mounted on the aircraft side.

An axle 37 perpendicular to the horizontal axle 8 and standing perpendicular to the plane of FIG. 3, has mountings. The mountings can each be slid in a groove 36. A first groove 36 is visible, while a second groove 36 (not shown) is below the outermost tube 4 on an under side of the sleeve 9. The telescopic arrangement 7 can rotate to a limited extent around the horizontal axle 37 and is limited by two hard shock absorbers 38. The shock absorbers 38 are provided with spring elements that engage on one end with the horizontal axle 8 and on the other end with the sleeve 9. The sleeve 9 is clamped firmly to the outermost tube 4 with screws 39, the screws 39 being indicated by their axes.

Two shock absorbers 40 engage on the vertical axle 37. One of the shock absorbers 40 is invisible below the outermost tube 4. The shock absorbers 40 have other positive engagement on suitable positions on the funnel 10. The shock absorbers 40 are hard in relation to shortening and very yielding in relation to extension, exhibiting a pronounced hysteresis characteristic.

Operation of this first previously represented modification of the first embodiment proceeds as follows. In a rest, or starting, position of the telescopic arrangement 7, the middle tube 5 and the inner tube 6 are retracted completely into the outermost tube 4. The control pressure gas pipe 15, which goes outside the take-off device forward of the pilot (not shown) of the aircraft, is at first without pressure. As soon as the valve 16 is impacted with the control pressure, the valve 16 in the head piece (referenced 33) of the inner tube 6 opens and allows the gas stored inside the inner tube 6 to flow out. The rising pressure in the middle tube 5 exerts a force on the cross sectional area of the inner tube 6, which forces the inner tube 6 to the rear relative to the middle tube 5. Simultaneously, the pressurised gas flows through the still-open throttle valve 41 in the head piece (reference 34) of the middle tube 5 into the inside of the outermost tube 4. Thereby, a force arises on the cross sections of the middle tube 5 and the inner tube 6, which force moves the middle tube 5 rearward relative to the outermost tube 4 surrounding the middle tube 5. Since the inner tube 6, however, is pressing on an anchor point in the surroundings, the outermost tube 4 and the middle tube 5 move forwards, and the aircraft, onto which the force so operating via the horizontal axle 8 of the frame 3 is transmitted, is accelerated. By adjusting the cross section of the throttle valve 41, the middle tube 5 and the inner tube 6 can be fully extended almost simultaneously. Towards the end of the sliding path of the middle tube 5 and the inner tube 6, the guide rings 18 meet the damping devices, further details of which are shown in FIG. 4.

During the whole of the extension process, the cylindrical clearance 20(1) ventilates directly to the outside and the cylindrical clearance 25 ventilates into the pressure chamber 11 via the holes 28 and 29. Shortly before reaching the final position of the middle tube 5, the row of holes 30 is opened by the seal 17(3) of the guide ring 18; shortly before the main release valve 24 comes into action, a portion of the pressurised gas present in the outermost tube 4 is blown off at full pressure into the pressure chamber 11 via the holes 30.

On reaching full extension, the movement impulse of the middle tube 5 and the inner tube 6 is transmitted to the outermost tube 4 via the damping devices 21(1) and 21(3), which performs a movement to the rear relative to the aircraft that is facilitated by the grooves 36 and limited and damped by the shock absorbers 38. This relative movement of the outermost tube 4 to the rear causes the ring 22 carrying the funnel 10 to slide forward and thereby release the openings 23 of the main release valve 24 and, due to the hysteresis characteristic of the shock absorber 40, also keeps the shock absorbers 40 open. The tubes 4, 5, and 6 are now without pressure. The blown off pressurised gas guided to the rear by the funnel 10 generates an additional thrust, which additional thrust supports the take-off process.

The air present in the pressure chamber 11 can now only flow back through the holes 29, since the holes 30 are closed by the elastomer band 31. The air present in the pressure chamber 11 flows into the cylindrical clearance 25 and exerts a force on the cross section thereof, which force pushes the middle tube 5 into the inside of the outermost tube 4. As soon as the row of holes 28 in the middle tube 5 come to lie within the seal 17 on the outer guide ring 19 of outermost tube 4, the air streams out of the pressure chamber 11 into the cylindrical clearance 20 between the middle tube 5 and the inner tube 6, whereby the inner tube 6 is fully retracted. Thereupon, the blow-off valve 32 on the pressure chamber 11 can be, for instance, electrically activated and the whole system made pressureless.

An embodiment of a damping device 21(1) is presented in FIG. 4. The aim which is addressed in particular here lies primarily in the time extension of the power thrust, thus in the reduction of the momentum change per time unit, since $$F = dp/dt$$

where

F=Force dp/dt=time dependent change of momentum

Secondarily, the aim of removing from the system a part of the kinetic energy due to frictional work in the telescopic arrangement can be addressed. The embodiment according to FIG. 4 has, to this end, the following construction. On the inner tube 6, following the inner guide ring 18, sit several, for instance, 40 pieces, of plastics material rings 45 and O-rings 46, arranged alternately, as shown to the left of the break line in FIG. 4. This arrangement is closed, for instance, in each case by a plastics material ring 45, so as to produce the same conditions for all the O-rings 46. Between the plastics material rings 45 and the O-rings 46 and an inner wall of the middle tube 5 there is a separation to facilitate access to the holes 28 for the air in the cylindrical clearance 20(1).

If the inner tube 6 is extended so far that the rearmost plastics material ring 45 strikes the outer guide ring 19(2) of the middle tube 5, the O-rings 46 are pressed together, as shown on the right of the break line in FIG. 4. The whole spring path of all the O-rings 46 results in a braking path for the inner tube 6. As soon as the O-rings 46 are sufficiently compressed together such that the O-rings 46 touch the inner wall of the middle tube 5, frictional forces arise; therefore, frictional work between the O-rings 46 and the inner wall results. The elasticity of the O-rings 46 and the pressurised gas flowing in through the holes 28 free the O-rings 46 again from the position shown and thereby permit the retraction of the inner tube 6.

Although shown on the middle tube 5 and the inner tube 6, the representation applies in the same way for the damping device 21(3) between the outermost tube 4 and the middle tube 5. The head piece of the inner tube 6 has been omitted, as the head piece does not contribute to the function described.

Obviously, the damping device 21(1) can individually be addressed differently, as long as the damping device 21(1) distributes the changing of the impulsion to a limited and defined path and reduces at least a part of the kinetic energy via frictional work.

Figure 5:
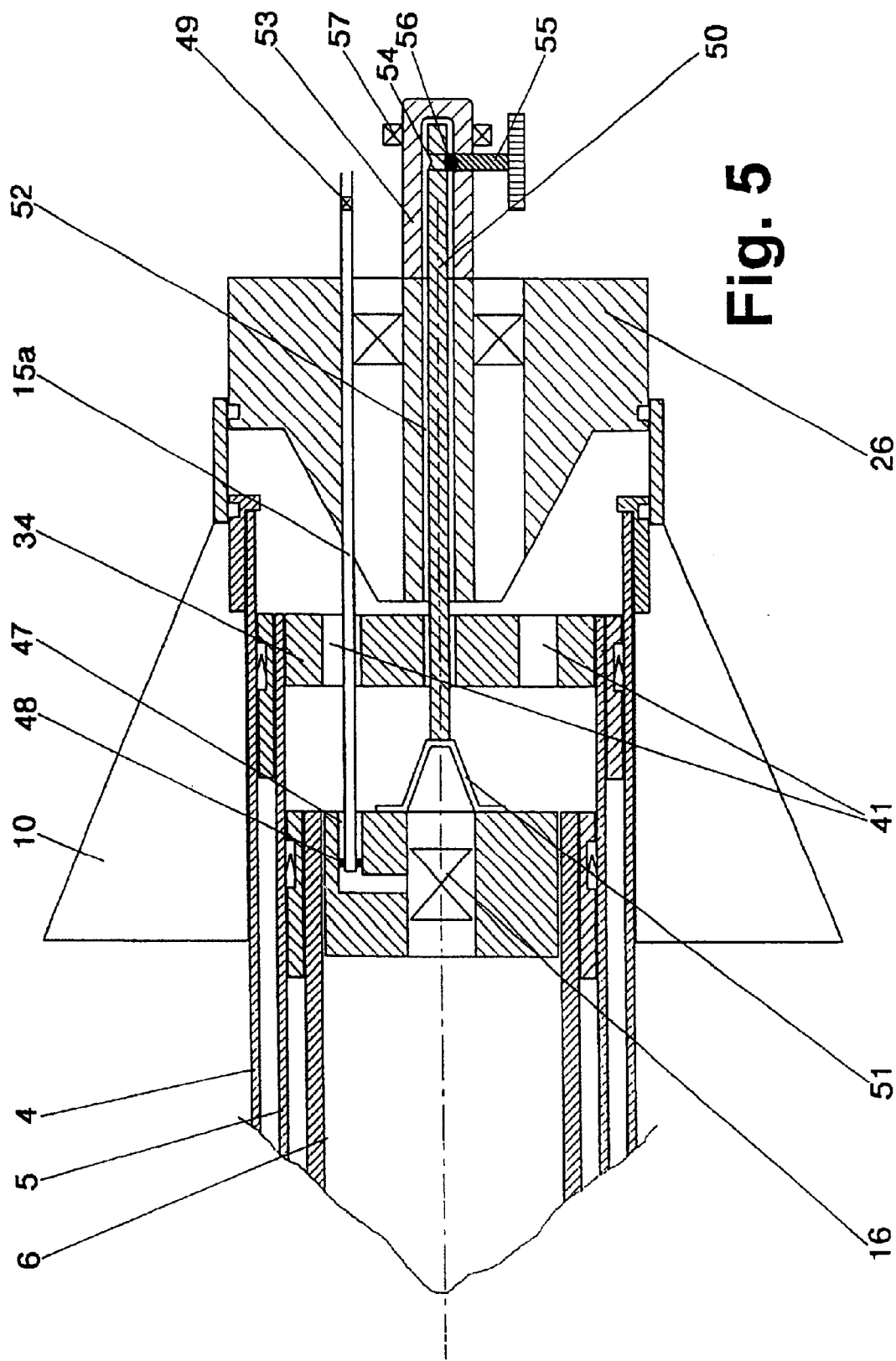
FIG. 5 is a view of a modification of the embodiment of the invention shown in FIGS. 2, 3, and 4.

A modification to the embodiment according to FIGS. 2, 3, 4 is the subject of FIG. 5. The telescopic arrangement 7 is shown in FIG. 5 in the fully retracted position. Instead of taking the pressurised gas control pipe 15 through the high pressure gas store present in the inner tube 6, the valve 16 arranged in the head piece 33 of the inner tube 6 is controlled from the head side of the arrangement. To this end, the pressurised gas control pipe(referenced 15a) passes through the head piece 26 of the outermost tube 4 and is anchored there. From the head piece 26, the pressurized control pipe 15a runs through one of always-open throttle valves 41 and then reaches a boring 47. The boring 47 is open towards the front in the head piece 33 of inner tube 6. The head piece of the inner tube 6 leads to the valve 16. The pressurised gas control pipe 15a is sealed in the boring 47 with an O-ring 48.

A schematically shown control valve 49 opens the way for the pressure control gas to the valve 16, whereby the valve 16 can be opened. Closing of the valve 16 after completion of the take-off process can be effected either pneumatically or mechanically using means not shown.

Further detail applicable to FIGS. 2–4 and to the modification shown in FIG. 5 includes a securing rod 50, which, for instance, is fastened to the head piece 33 of the inner tube 6 using a tripod 51. The securing rod 50 passes through, for instance, the centre of the throttle valve 41 in the head piece 34, is taken with play through a boring 52 in the head piece 26, and ends in a support 53 fastened airtight thereto. At the forward end, the securing rod 50 has a groove 54 with a somewhat semi-circular cross section in which a securing screw 55 can engage. The securing screw 55 carries a heavily spring loaded ball 56 at a tip thereof, so that the securing rod 50 must be pulled back against the force of the spring loaded ball 56. The force of the spring loaded ball 56 can be so adjusted such that the telescopic arrangement 7 remains secured in the retracted position against all normal vibration, such that the force of the spring loaded ball 56 is also sufficient to compensate for the forces generated by the control gas pressure on the cross section of the boring 47, and such that the force of the full working pressure can nevertheless pull the securing rod 50 out of a snap locking position. Obviously, this conditional detent can be otherwise configured as long as the conditional detent fulfils the noted aims.

The arrangement of the pressurised gas control pipe 15a (or 15) shown in FIG. 5 has the advantage over that shown in FIG. 2 of a short path. The control valve 49 must here be configured as a non-return valve against the working pressure.

On the support 53 there is an electro-magnetic sensor 57, which, by known electronic means, can establish whether the securing rod 50 is retracted and/or moves. In other words, the sensor 57 functions as a position and movement sensor.

Although appearing different from the basic concept underlying the previous description, the device according to principles of the invention also permits site-fixed application. The take-off device, guided in the frame 3 is anchored to the ground, and the middle tube 5, the inner tube 6, or possibly further such, are extended by the action of the pressurised gas. Both unmanned aircraft (i.e., drones) and vehicles are objects that can be accelerated using embodiments of the invention. The object to be accelerated has a centre of gravity essentially at the now forward end of the outermost tube 4. The take-off process thereby operates in a similar fashion to that on an aircraft carrier. A particular advantage is the easy transportability of the device according to principles of the invention, in which all the functions described, apart from the direction of movement, remain essentially unchanged.

What is claimed is:

1. A take-off and accelerating device comprising:
    a telescopic arrangement having an outer tube, an inner tube, and at least one middle tube, the inner tube, the outer tube, and the at least one middle tube being adapted to slide against each other and being airtight;
    at least one pressure accumulator having a valve for release of an outflow of compressed gas out of the at least one pressure accumulator into the telescopic arrangement, the at least one pressure accumulator comprising means to open the valve and means to damp the outer tube, the inner tube, and the at least one middle tube against each other at ends of their respective sliding motions;
    wherein the outermost tube is mounted in a frame;
    wherein the device is adapted to be installed on-board a vehicle;
    means for retracting the inner tube and the at least one middle tube from a telescopically extended condition into a retracted condition; and
    means for blowing off pressurised gas after extension of the telescopic arrangement.

2. The device according to claim 1,
wherein the inner tube is configured as a pressure accumulator, has a base with a filling valve, and has a lead-through for a pressurised gas control pipe;
wherein the pressurised gas control pipe passes through an entire length of the inner tube; and
wherein the inner tube has a head piece at an end of the inner tube, the head piece including a valve, the pressurized gas control pipe opening into the head piece.

3. The device according to claim 2, wherein the pressurised gas control pipe is fed from outside the device.

4. The device according to claim 1:
wherein the inner tube is configured as a pressure accumulator and has a base with a filling valve;
wherein the outer tube and the at least one middle tube each have a head piece;
wherein the head piece of the at least one middle tube has a plurality of borings adapted to act as throttle valves;
wherein the head piece of the outer tube has a plurality of relief valves and a plurality of radially opening holes; and
further comprising a pressurised gas control pipe going out from the head piece of the outer tube, the pressurised gas control pipe passing through the at least one middle tube, being sealed by means of O-rings, and opening into a boring in the head piece of the inner tube such that opening of the valve in the head piece of the inner tube can be controlled from the head piece of the outer tube.

5. The device according to claim 1, wherein:
the inner tube is configured as a pressure accumulator and has a base with a filling valve; and
the valve in the head piece of the inner tube is electrically operated.

6. The device according to claim 1, wherein:
the outer tube and the at least one middle tube are dimensioned such that a first cylindrical clearance arises between an internal diameter of the outer tube and an outer diameter of the at least one middle tube;
a second cylindrical clearance arises between an internal diameter of the at least one middle tube and an outer diameter of the inner tube;
the at least one middle tube has an inner guide ring with a seal in a region of a head piece thereof;
the inner tube has an inner guide ring with a seal in a region of a head piece of the inner tube;
the outer tube has an outer guide ring with a seal at an end of the outer tube away from a head piece of the outer tube;
the at least one middle tube has an outer guide ring with a seal at an end of the at least one middle tube away from a head piece of the at least one middle tube.

7. The device according to claim 6:
further comprising means for damping the inner tube, the outer tube, and the at least one middle tube against each other at an end of sliding travel therebetween, the means for damping being arranged in the cylindrical clearances;
wherein the means for damping comprises a damping element comprising a plurality of alternately arranged plastics material rings and O-rings; and
wherein the damping element is pressed at an end of relative sliding movement paths of the inner tube, the outer tube, and the at least one middle tube.

8. The device according to claim 7, wherein the O-rings are dimensioned such that the O-rings exert frictional force on an inner wall of the outer tube and the at least one middle tube as a consequence of compression of the O-rings.

9. The device according to claim 1, wherein:
in a region of the centre of gravity of the telescopic arrangement when the telescopic arrangement is in the retracted condition, a sleeve is clamped to the outer tube;
the frame has an essentially horizontal axle about which the frame can pivot;
two aligned essentially vertical axles stand out from the frame and are each mounted so as to slide in a groove on the sleeve at right angles to the essentially vertical axles;
the frame is connected to the sleeve by at least two first hard shock absorbers provided with spring elements positioned on the essentially horizontal axle;
at least two second shock absorbers with a hysteresis characteristic run from each of the vertical axles to a funnel, the two second shock absorbers being relatively hard with respect to shortening and relatively weak with respect to extension, such that a thrust force following extension of the telescopic arrangement pushes the sleeve against the first shock absorbers with respect to the frame, which thrust force is transferred via the second shock absorbers to the funnel and slides the funnel, such that a ring can release openings in the head piece of the outer tube and the pressurised gas present in the telescopic arrangement that is no longer required can escape through the funnel.

10. A take-off and accelerating device for aircraft and vehicles according to claim 7, characterised in that
the means of retracting the telescopically extended tubes (5, 6) back into the retracted position comprise the following
all the tubes (4, 5) apart from the innermost have at least one row of holes (28, 29) along the circumference which are so arranged that in the extended condition of the telescopic arrangement (7) they each lie between the outer guide ring (19) of the larger and the inner guide ring (18) of the smaller of the said tubes (4, 5, 6),
the outer tube (4) has at least one further row of holes (30), lying along its circumference which lies outside the stated separation of the guide rings (18, 19) and closer to the head piece (26) of the outer tube (4), and are covered by an elastomer band (31) and thereby operate as a non-return valve,
a pressure chamber (11) is present, which surrounds the outer tube (4) for a part of its length and covers the first, at least one row of holes (29) and the second row of holes (30) and has a blow-off valve (32),
in the extension of the telescopic arrangement (7) the inner guide ring (18) with the seal (17) of the middle tube (5), on passing the second row of holes (30), releases them, whereby a part of the pressurised gas can flow into the pressure chamber (11), from where after blowing off through the openings (23) the pressurised gas reaches the cylindrical clearance (25) between the outer and the middle tubes (4, 5) out of the pressure chamber (11), through the force built up on the cross sectional surface of the cylindrical clearance (25) the middle tube is driven back into the outer tube (4) and, as soon as the inner guide ring (18) with the seal (17) of the inner tube (6) comes to lie within the outer guide ring (19) with seal (17) of the outer tube (4), a retracting force is built up in the cylindrical clearance (20) also, between the middle and the inner tube (6), which drives the inner tube (6) back into the middle tube (5).

11. The device according to claim 1, further comprising at least one external pressure accumulator attached outside the telescopic arrangement.

12. The device according to claim 11, wherein the at least one external pressure accumulator has a main valve and a filling valve.

13. The device according to claim 11, wherein the at least one pressure accumulator is connected by a flexible connector to a pressure tube, the pressure tube opening into the head piece of the outer tube.

14. The device according to claim 12 or 13, wherein the head piece of the inner tube is fully closed.

15. The device according to claim 12 or 13, wherein the head piece of the inner tube contains a plurality of relief valves and the base of the inner tube has openings for escape of the pressurised gas blown off through the relief valves.

16. The device according to claim 13, further comprising means for compensating, at least in part, for adiabatic cooling caused by a reduction in pressure of the pressurised gas.

17. The device according to claim 16, wherein the means for compensating comprises a heat store, the heat store being penetrated by a plurality of tubes, each of the plurality of tubes being fed from the pressure tube and feeding the pressure tube.

18. The device according to claim 17, wherein the plurality of tubes are enclosed in a container having an inlet and an outlet for a heating medium.

19. The device according to claim 18, wherein the heating medium comprises exhaust gases of an internal combustion engine.

20. The device according to claim 1, wherein the device is stationary, the frame is mounted by a horizontal axle pivoting in a stationary installation part, and a base of the inner tube is adapted to thrust against an object to be accelerated.

21. The device according to claim 1, wherein the device is built into a moveable object.

22. The device according to claim 21, wherein the moveable object is an aircraft, the frame is mounted by a horizontal axle so that the frame can pivot in a fixed part of the aircraft essentially at the centre of gravity of the aircraft, and the base of the inner tube is adapted to operate against a fixed thrust point.

23. The device according to claim 1, wherein:
   a head piece of the inner tube carries a securing rod running essentially parallel to an axis of the inner tube, the axis penetrating, with play, a head piece of the at least one middle tube and a head piece of the outer tube;
   the head piece of the outer tube carries an airtight support fastened pressure-tight thereto, and in which a securing screw is introduced in an airtight manner and which has a spring loaded ball at a tip thereof,
   the securing rod is sufficiently long that, with the telescopic arrangement fully retracted, the securing rod enters the airtight support far enough so that the spring loaded ball can snap into a ring groove in the securing rod.

24. The device according to claim 23, wherein the airtight support carries an electromagnetic sensor, the electromagnetic sensor being adapted to respond to presence and movement of the securing rod.

25. The device according to claim 1, wherein the vehicle is an aircraft.

* * * * *

UNITED STATES PATENT AND TRADEMARK OFFICE
CERTIFICATE OF CORRECTION

PATENT NO. : 6,536,708 B1
DATED : March 25, 2003
INVENTOR(S) : Reinhard et al.

It is certified that error appears in the above-identified patent and that said Letters Patent is hereby corrected as shown below:

Column 8, line 33 through Column 9, line 5,

```
Delete "A take-off and accelerating device
for aircraft and vehicles according to Claim
7, characterised in that
-the means of retracting the telescopically
extended tubes (5, 6) back into the retracted
position comprise the following
-all the tubes (4, 5)apart from the innermost
have at least one row of holes (28, 29) along
the circumference which are so arranged that
in the extended condition of the telescopic
arrangement (7) they each lie between the
outer guide ring (19) of the larger and the
inner guide ring (18) of the smaller of the
said tubes (4, 5, 6),
-the outer tube (4) has at least one further
row of holes (30), lying along its
circumference which lies outside the stated
separation of the guide rings (18, 19) and
closer to the head piece (26) of the outer
tube (4), and are covered by an elastomer band
(31) and thereby operate as a non-return
valve,
-a pressure chamber (11) is present, which
surrounds the outer tube (4) for a part of its
length and covers the first, at least one row
of holes (29) and the second row of holes (30)
and has a blow-off valve (32),
```

UNITED STATES PATENT AND TRADEMARK OFFICE
CERTIFICATE OF CORRECTION

PATENT NO. : 6,536,708 B1
DATED : March 25, 2003
INVENTOR(S) : Reinhard et al.

It is certified that error appears in the above-identified patent and that said Letters Patent is hereby corrected as shown below:

Column 8, line 33 through Column 9, line 5 cont'd,

```
-in the extension of the telescopic
arrangement (7) the inner guide ring (18)
with the seal (17) of the middle tube (5), on
passing the second row of holes (30), releases
them, whereby a part of the pressurised gas
can flow into the pressure chamber (11), from
where after blowing off through the openings
(23) the pressurised gas reaches the
cylindrical clearance (25) between the outer
and the middle tubes (4,5) out of the pressure
chamber (11), through the force built up on
the cross sectional surface of the cylindrical
clearance (25) the middle tube is driven back
into the outer tube (4) and, as soon as the
inner guide ring (18) with the seal (17) of
the inner tube (6) comes to lie within the
outer guide ring (19) with seal (17) of the
outer tube (4), a retracting force is built up
in the cylindrical clearance (20) also,
between the middle and the inner tube (6),
which drives the inner tube (6) back into the
middle tube (5)."
```

Signed and Sealed this

Twenty-first Day of October, 2003

JAMES E. ROGAN
*Director of the United States Patent and Trademark Office*